United States Patent
Kwon et al.

(10) Patent No.: US 12,051,529 B2
(45) Date of Patent: Jul. 30, 2024

(54) ORIENTED ELECTRICAL STEEL SHEET AND METHOD FOR PRODUCING SAME

(71) Applicant: POSCO, Pohang-si (KR)

(72) Inventors: Oh-Yeoul Kwon, Pohang-si (KR); Woo-Sin Kim, Pohang-si (KR); Jong-Tae Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 438 days.

(21) Appl. No.: 17/415,815

(22) PCT Filed: Dec. 18, 2019

(86) PCT No.: PCT/KR2019/018034
§ 371 (c)(1),
(2) Date: Jun. 18, 2021

(87) PCT Pub. No.: WO2020/130646
PCT Pub. Date: Jun. 25, 2020

(65) Prior Publication Data
US 2022/0044855 A1 Feb. 10, 2022

(30) Foreign Application Priority Data
Dec. 19, 2018 (KR) .......... 10-2018-0165643

(51) Int. Cl.
*H01F 1/16* (2006.01)
*B23K 26/364* (2014.01)
(Continued)

(52) U.S. Cl.
CPC .............. *H01F 1/16* (2013.01); *B23K 26/364* (2015.10); *H01F 41/0233* (2013.01);
(Continued)

(58) Field of Classification Search
CPC .. C21D 8/1233; C21D 8/1272; C21D 8/1283; H01F 1/14716; H01F 1/14725;
(Continued)

(56) References Cited

U.S. PATENT DOCUMENTS

| 4,904,312 A | 2/1990 | Beckley et al. |
| 2018/0010206 A1* | 1/2018 | Kwon ............... C22C 38/001 |

FOREIGN PATENT DOCUMENTS

| CN | 101154595 A | 4/2008 |
| CN | 104726672 A | 6/2015 |

(Continued)

OTHER PUBLICATIONS

Machine translation of JP 2017/095745 (Year: 2017).*
(Continued)

*Primary Examiner* — Zachary M Davis
(74) *Attorney, Agent, or Firm* — Morgan, Lewis & Bockius LLP

(57) ABSTRACT

A manufacturing method of a grain-oriented electrical steel sheet according to an embodiment of the present invention, includes: manufacturing a cold-rolled sheet; forming a groove by irradiating a laser beam on the cold-rolled sheet; and partially removing an oxide layer formed on a surface of the cold-rolled sheet so that a thickness of the oxide layer remains at 1 to 5 nm, wherein the grain-oriented electrical steel sheet has islands of 0.25 or less having sphericity of 0.5 to 0.9 under the oxide layer under the groove.

4 Claims, 3 Drawing Sheets

(51) Int. Cl.
*H01F 41/02* (2006.01)
*C21D 6/00* (2006.01)
*C21D 8/12* (2006.01)
*C21D 9/46* (2006.01)

(52) U.S. Cl.
CPC ........... *C21D 6/008* (2013.01); *C21D 8/1233* (2013.01); *C21D 8/1272* (2013.01); *C21D 9/46* (2013.01)

(58) Field of Classification Search
CPC .... H01F 1/14775; H01F 1/14783; H01F 1/16; H01F 1/18
See application file for complete search history.

(56) References Cited

FOREIGN PATENT DOCUMENTS

| | | |
|---|---|---|
| CN | 107109511 A | 8/2017 |
| EP | 3025797 A1 | 6/2016 |
| EP | 3239325 A1 | 11/2017 |
| JP | 2003-129135 A | 5/2003 |
| JP | 2004-238734 A | 8/2004 |
| JP | 2015-105220 A | 6/2015 |
| JP | 2016-145419 A | 8/2016 |
| JP | 2016-532776 A | 10/2016 |
| JP | 2017-095745 A | 6/2017 |
| JP | 2017-145506 A | 8/2017 |
| JP | 2018-508647 A | 3/2018 |
| KR | 10-1993-0002525 A | 2/1993 |
| KR | 10-2008-0010454 A | 1/2008 |
| KR | 10-2015-0012205 A | 2/2015 |
| KR | 10-2016-0078104 A | 7/2016 |
| KR | 10-2016-0078242 A | 7/2016 |
| KR | 10-2016-0078247 A | 7/2016 |
| KR | 10-1676628 B1 | 11/2016 |
| KR | 10-1693516 B1 | 1/2017 |
| KR | 10-1719231 B1 | 4/2017 |
| KR | 10-1751525 B1 | 7/2017 |
| KR | 10-2017-0107085 A | 9/2017 |
| KR | 10-2018-0073306 A | 7/2018 |
| KR | 10-2018-0073343 A | 7/2018 |
| KR | 10-2020-0076501 A | 6/2020 |
| KR | 10-2020-0076503 A | 6/2020 |
| KR | 10-2221606 B1 | 2/2021 |
| WO | WO2012-164746 A1 | 7/2014 |
| WO | WO-2016105053 A1 * | 6/2016 ......... B23K 26/0622 |

OTHER PUBLICATIONS

Extended European Search Report dated Feb. 3, 2022 issued in European Patent Application No. 19897878.5.
Office Action & Search Report issued Jun. 17, 2023 for corresponding Chinese Patent Application No. 201980084619.6.
International Search Report (with partial translation) and Written Opinion dated Apr. 13, 2020, issued in corresponding International Patent Application No. PCT/KR2019/018034.

* cited by examiner

ORIENTED ELECTRICAL STEEL SHEET AND METHOD FOR PRODUCING SAME

CROSS-REFERENCE OF RELATED APPLICATIONS

This application is the U.S. National Phase under 35 U.S.C. § 371 of International Application No. PCT/KR2019/018034 filed on Dec. 18, 2019, which claims the benefit of Korean Application No. 10-2018-0165643 filed on Dec. 19, 2018, the entire contents of each are hereby incorporated by reference.

TECHNICAL FIELD

The present invention relates to a grain-oriented electrical steel sheet and a manufacturing method thereof. More specifically, the present invention relates to a grain-oriented electrical steel sheet and a manufacturing method thereof that may improve magnetism and may improve a close contacting property to an insulating coating layer, by appropriately forming an island by removing a portion of an oxide layer after forming a groove.

BACKGROUND ART

Since a grain-oriented electrical steel sheet is used as an iron core material of an electrical device such as a transformer, in order to improve energy conversion efficiency thereof by reducing power loss of the device, it is necessary to provide a steel sheet having excellent iron loss of the iron core material and a high occupying ratio when being stacked and spiral-wound.

The grain-oriented electrical steel sheet refers to a functional material having a texture (referred to as a "GOSS texture") of which a secondary-recrystallized grain is oriented with an azimuth {110}<001> in a rolling direction through a hot rolling process, a cold rolling process, and an annealing process.

As a method of reducing the iron loss of the grain-oriented electrical steel sheet, a magnetic domain refining method is known. In other words, it is a method of refining a large magnetic domain contained in a grain-oriented electrical steel sheet by scratching or energizing the magnetic domain. In this case, when the magnetic domain is magnetized and a direction thereof is changed, energy consumption may be reduced more than when the magnetic domain is large. The magnetic domain refining methods include a permanent magnetic domain refining method, which retains an improvement effect even after heat treatment, and a temporary magnetic domain refining method, which does not retain an improvement effect after heat treatment.

The permanent magnetic domain refining method in which iron loss is improved even after stress relaxation heat treatment at a heat treatment temperature or more at which recovery occurs may be classified into an etching method, a roll method, and a laser method. According to the etching method, since a groove is formed on a surface of a steel sheet through selective electrochemical reaction in a solution, it is difficult to control a shape of the groove, and it is difficult to uniformly secure iron loss characteristics of a final product in a width direction thereof. In addition, the etching method has a disadvantage that it is not environmentally friendly due to an acid solution used as a solvent.

The permanent magnetic domain refining method using a roll is a magnetic domain refining technology that provides an effect of improving iron loss that partially causes recrystallization at a bottom of a groove by forming the groove with a certain width and depth on a surface of a plate by pressing the roll or plate by a protrusion formed on the roll and then annealing it. The roll method is disadvantageous in stability in machine processing, in reliability due to difficulty in securing stable iron loss depending on a thickness, in process complexity, and in deterioration of the iron loss and magnetic flux density characteristics immediately after the groove formation (before the stress relaxation annealing).

The permanent magnetic domain refining method using a laser is a method in which a laser beam of high output is irradiated onto a surface portion of an electrical steel sheet moving at a high speed, and a groove accompanied by melting of a base portion is formed by the laser irradiation. However, these permanent magnetic domain refining methods also have difficulty in refining the magnetic domain to a minimum size.

Current technology of the temporary magnetic domain refining method does not focus on performing coating once again after irradiating the laser in a coated state, and thus, the laser is not attempted to be irradiated with a predetermined intensity or higher. This is because when the laser is irradiated with a predetermined intensity or higher, it is difficult to properly obtain a tension effect due to damage to the coating.

Since the permanent magnetic domain refining method is to increase a free charge area that may receive static magnetic energy by forming a groove, a deep groove depth is required as much as possible. In addition, a side effect such as a decrease in magnetic flux density also occurs due to the deep groove depth. Therefore, in order to reduce the magnetic flux density deterioration, the groove is managed with an appropriate depth.

On the other hand, a grain-oriented electrical steel sheet manufactured by a magnetic domain refining technology is manufactured into products such as transformer cores through molding and heat treatment processes. In addition, since a product is used in a relatively high temperature environment, it is necessary to secure not only iron loss characteristics but also a close contacting property to the insulating coating layer.

DISCLOSURE

The present invention has been made in an effort to provide a grain-oriented electrical steel sheet and a manufacturing method thereof. More specifically, the present invention has been made in an effort to provide a grain-oriented electrical steel sheet and a manufacturing method thereof that may improve magnetism and may improve a close contacting property to an insulating coating layer, by appropriately forming an island by removing a portion of an oxide layer after forming a groove.

An embodiment of the present invention provides a grain-oriented electrical steel sheet, including a groove positioned on a surface of an electrical steel sheet, a metal oxide layer positioned on the groove, and metal oxide-based islands that are discontinuously distributed and positioned under the groove, wherein average sphericity of the islands positioned under the groove is 0.5 to 0.9.

A density of the islands positioned under the groove is 0.25 pieces/pmt.

2 to 10 grooves may be intermittently present with respect to a rolling vertical direction.

A length direction of the groove and a rolling direction of the steel sheet may form an angle of 75 to 88°.

A manufacturing method of the grain-oriented electrical steel sheet according to the embodiment of the present invention includes: manufacturing a cold-rolled sheet; forming a groove by irradiating a laser beam on the cold-rolled sheet; and partially removing an oxide layer formed on a surface of the cold-rolled sheet so that a thickness of the oxide layer remains at 1 to 5 nm.

In the forming of the groove, a laser beam scanning rate may be 10 m/s or more.

In the forming of the groove, a gas may be injected toward the groove at an angle of 70° or less with respect to a rolling direction.

A pressure of the injected gas may be 0.02 kg/cm$^2$ or more.

A water content of the injected gas may be 50 wt % or less.

After the forming of the groove, an oxide layer having a thickness of 4 to 10 nm may be present on a surface of the cold-rolled sheet.

According to the embodiment of the present invention, it is possible to improve magnetism and to improve a close contacting property with an insulating coating layer, by partially removing an oxide layer after forming a groove.

MODE FOR INVENTION

It will be understood that, although the terms first, second, third, etc. may be used herein to describe various elements, components, regions, areas, zones, layers, and/or sections, they are not limited thereto. These terms are only used to distinguish one element, component, region, area, zone, layer, or section from another element, component, region, layer, or section. Therefore, a first part, component, region, area, zone, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

Figure 1:
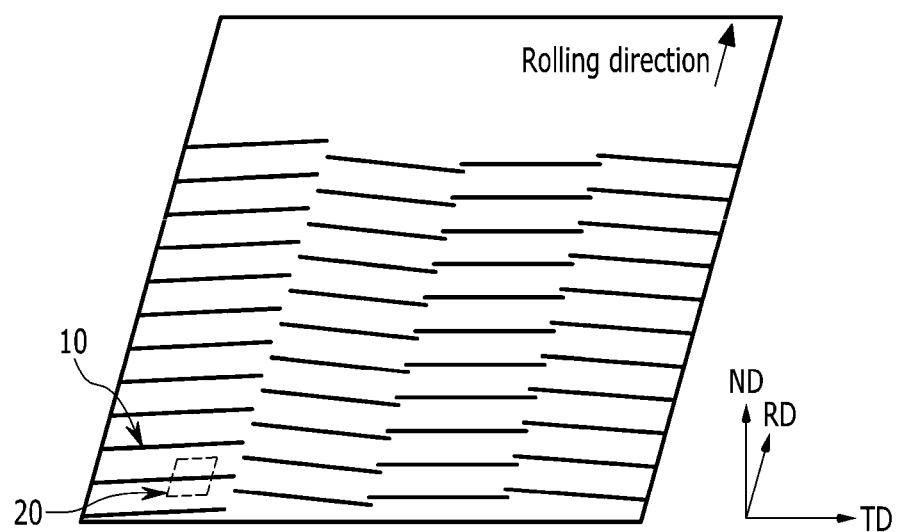
FIG. 1 illustrates a schematic view of a rolled surface (ND surface) of a grain-oriented electrical steel sheet according to an embodiment of the present invention.

FIG. 1 illustrates a schematic view of a grain-oriented electrical steel sheet 10 that is magnetic-domain-refined by an embodiment of the present invention.

As shown in FIG. 1, a grain-oriented electrical steel sheet 10 according to an embodiment of the present invention is provided with a linear groove 20 formed in a direction crossing a rolling direction (RD direction) on one surface or both surfaces of the electrical steel sheet.

In the embodiment of the present invention, a groove is formed through a laser, and a portion of an oxide layer present in a process of forming the groove is removed, so that a uniform metal oxide layer is formed in a secondary recrystallization annealing process, and ultimately, it is possible to improve magnetism and to improve a close contacting property to a insulating coating layer. In this case, the metal oxide layer may be a forsterite (FeMg$_2$SiO$_4$) layer.

A manufacturing method of the grain-oriented electrical steel sheet according to the embodiment of the present invention includes: manufacturing a cold-rolled sheet; forming a groove by irradiating a laser beam on the cold-rolled sheet; and removing a portion of an oxide layer formed on a surface of the cold-rolled sheet to maintain a thickness of the oxide layer at 1 to 5 nm.

Hereinafter, respective steps will be specifically described.

First, a cold rolled sheet is manufactured. An embodiment of the present invention is characterized in a magnetic domain refining method after the cold-rolled sheet is manufactured, and the cold-rolled sheet to be subjected to magnetic domain refining may be a cold-rolled sheet used in a field of grain-oriented electrical steel sheets without limitation. Particularly, an effect of the present invention is realized regardless of an alloy composition of the grain-oriented electrical steel sheet. Therefore, a detailed description of the alloy composition of the grain-oriented electrical steel sheet will be omitted. For example, the cold-rolled sheet may include, in wt %, C at 0.10% or less, Si at 1.0 to 6.5%, Mn at 0.005 to 3.0%, Nb+V+Ti at 0.015% or less, Cr+Sn at 1.0% or less, Al at 3.0% or less, P+S at 0.09% or less, a total of rare earths and other impurities at 0.3%, and the balance of Fe.

Manufacturing methods of the cold-rolled sheet used in a grain-oriented electrical steel sheet field may be used for the manufacturing method of the cold-rolled sheet without limitation, and a detailed description thereof will be omitted.

Next, the cold-rolled sheet is irradiated with a laser beam to form a groove.

The groove may be formed by irradiating a TEMoo (M$_2$≤1.25) laser beam having an average power of 500 W to 10 KW on a surface of the cold-rolled sheet. A laser oscillation method may be used without limitation. That is, a continuous oscillation or pulsed mode may be used. In this way, the laser beam is irradiated so that a surface beam absorption rate is greater than or equal to heat of melting the steel sheet, thereby forming the groove 20 shown in FIG. 1 and FIG. 2.

In this case, a scanning rate of the laser may be 10 m/s or more. When the scanning rate of the laser is too low, there may be a problem that the groove is not properly formed. More specifically, the scanning rate of the laser may be 10 m/s to 30 m/s.

In the forming of the groove, a gas may be injected toward the groove at an angle of 70° or less with respect to the rolling direction (RD direction). In this case, the angle is an angle based on a rolling vertical surface (TD surface). By properly spraying the gas, it is possible to prevent the melt from solidifying in the groove. When the angle is too high, the melt may not be properly removed.

In this case, a gas pressure may be 0.02 kg/cm$^2$ or more. When the gas pressure is too low, the melt may not be properly removed. More specifically, the gas pressure may be 0.02 to 0.2 kg/cm$^2$.

A moisture content of the injected gas may be 50 wt % or less. When the moisture content is too high, a non-uniform and thick oxide layer may be formed on the surface of the steel sheet due to gas injection. The oxide layer may form a non-uniform metal oxide layer in a process of secondary recrystallization annealing later to ultimately adversely affect close contacting properties and magnetism. More specifically, the moisture content of the injected gas may be 25 wt % or less.

As shown in FIG. 1, with respect to the rolling vertical direction, 2 to 10 grooves may be intermittently formed. However, the present invention is not limited thereto, and it is also possible to continuously form grooves.

Figure 2:
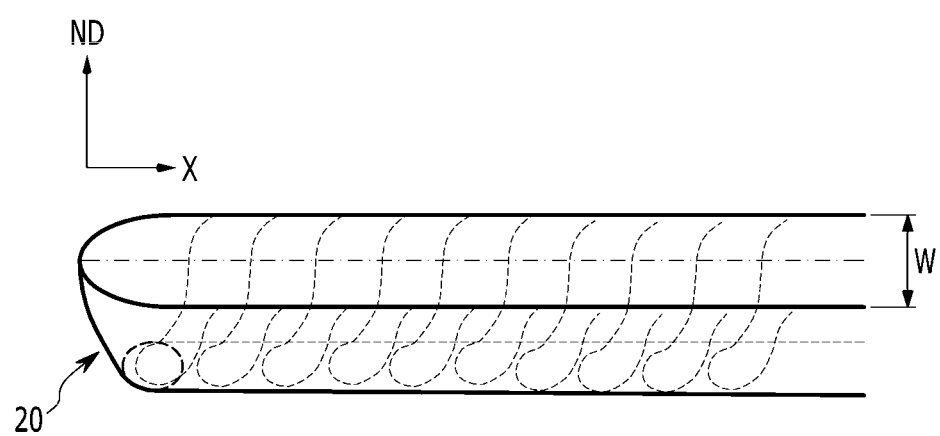
FIG. 2 illustrates a schematic view of a groove according to an embodiment of the present invention.

As shown in FIG. 1 and FIG. 2, a length direction (X direction) and the rolling direction (RD direction) of the groove 20 may form an angle of 75 to 88°. When forming the above-described angle, it may contribute to improving the iron loss of the grain-oriented electrical steel sheet.

A width W of the groove may be 10 to 200 μm. When the width of the groove 20 is narrow or wide, it may not be possible to obtain an appropriate magnetic domain refining effect.

In addition, a depth H of the groove may be 3 to 5% of the thickness of the steel sheet. When the depth H of the groove is too shallow, it is difficult to obtain a proper iron loss improvement effect. When the depth H of the groove is too deep, texture characteristics of the steel sheet 10 are significantly changed due to strong laser irradiation, or a large amount of hill-up and spatter are formed, so that magnetic properties may be deteriorated. Therefore, it is possible to control the depth of the groove 20 in the above-described range.

After the forming of the groove, the surface of the steel sheet may be partially oxidized by heat generated from the laser beam, oxygen and moisture in the air, and oxygen and moisture in the injection gas, so that an oxide layer may exist. Specifically, a thickness of the oxide layer may be 4 to 10 nm. In addition, the oxide layer may be formed non-uniformly on an entire surface of the steel sheet, and the thickness of the aforementioned oxide layer means an average thickness on the entire surface of the steel sheet.

When the oxide layer is formed too thickly, a problem in that the oxide layer thickly remains may occur even if the oxide layer is removed in an oxide layer removing step described later.

A re-solidification layer may be formed at lower and side portions of the groove due to the thermal effect of the laser beam. The re-solidification layer may have a thickness of 6.5 μm or less. When the re-solidification layer is formed too thickly, close contacting properties and iron loss may be deteriorated due to an increase in a heat-affected zone. The re-solidification layer includes recrystallization with an average particle diameter of 1 to 10 μm, and is distinguished from the overall structure of the electrical steel sheet being manufactured.

Next, a portion of the oxide layer formed on the surface of the cold-rolled sheet is removed, so that the thickness of the oxide layer remains at 1 to 5 nm.

When the oxide layer is not removed, the non-uniform oxide layer remains thick, and the metal oxide layer formed in the secondary recrystallization annealing process is formed non-uniform and thick, which causes deterioration of the magnetism, and deterioration of the close contacting property between the metal oxide layer and the basic structure.

Techniques for removing the hill-up or spatter formed during the groove formation process through a brush or pickling are known, but that the melt-solidified hill-up or spatter is removed and that the oxide layer is removed are completely different in terms of removing the oxide layer together in addition to the hill-up or spatter.

As a method of removing the oxide layer, it may be removed through friction between a polishing roll (paper) and the oxide layer by using the polishing paper or the polishing roll.

The thickness of the oxide layer remains at 1 nm to 5 nm. When the thickness of the oxide layer remains too thickly, the metal oxide layer is formed unevenly and thick, which causes deterioration of the magnetism and close contacting property. When the thickness of the oxide layer remains too thin, an appropriate metal oxide layer is not formed, which causes deterioration of the magnetism and close contacting property. More specifically, 2 to 5 nm of the oxide layer may remain.

After the remaining of the oxide layer, primary recrystallization annealing the cold-rolled sheet may be further included.

Since the primary recrystallization annealing is widely known in the field of grain-oriented electrical steel sheets, a detailed description thereof is omitted. In the primary recrystallization annealing process, decarburizing, or decarburizing and nitriding may be included, and annealing may be performed in a humid atmosphere for the decarburizing or the decarburizing and nitriding. A soaking temperature in the primary recrystallization annealing may be 800° C. to 950° C.

After the primary recrystallization annealing, applying an annealing separating agent and secondary recrystallization annealing may be further included. Since the annealing separating agent is widely known, a detailed description will be omitted. For example, the annealing separating agent including MgO as a main component may be used.

The purpose of the secondary recrystallization annealing is largely formation of {110}<001> texture by the secondary recrystallization, insulation-imparting by the formation of a glassy film by reaction between the oxide layer formed during the primary recrystallization annealing and MgO, and removal of impurities that degrades magnetic properties. In the method of the secondary recrystallization annealing, in the heating section before the secondary recrystallization occurs, the mixture of nitrogen and hydrogen is maintained to protect the nitride, which is a particle growth inhibitor, so that the secondary recrystallization may develop well, and in the soaking after the secondary recrystallization is completed, impurities are removed by maintaining it in a 100% hydrogen atmosphere for a long time.

The secondary recrystallization annealing may be performed at a soaking temperature of 900 to 1210° C.

Figure 3:
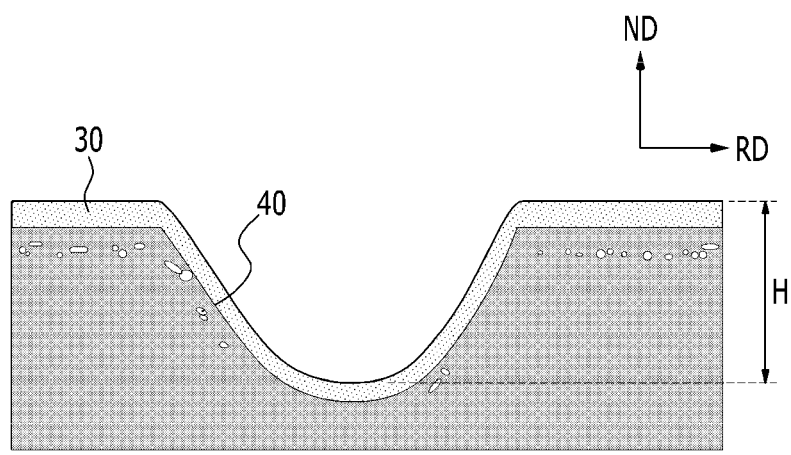
FIG. 3 illustrates a schematic view of a cross-section of a groove according to an embodiment of the present invention.

During the secondary recrystallization annealing process, the MgO component in the annealing separating agent reacts with the oxide layer formed on the surface of the steel sheet, thereby forming a metal oxide layer on the surfaces of the steel sheet and of the groove. In FIG. 3, the metal oxide layer 30 is schematically shown. In the embodiment of the present invention, since the groove is formed before the secondary recrystallization annealing, the metal oxide layer 30 may be formed not only on the steel sheet but also on the surface of the groove.

In the embodiment of the present invention, since the oxide layer is partially removed from the surface of the steel sheet after the groove is formed, the thickness of the oxide layer is thin, so that MgO in the annealing separating agent may penetrate or pass through the oxide layer to form an island 40 under the metal oxide layer 30. The island 40 may include forsterite.

In FIG. 3, the island 40 is schematically shown. As shown in FIG. 3, the island 40 may be formed under the metal oxide layer 30 so as to be separated from the metal oxide layer 30. Since the island 40 is made of an alloy composition similar to that of the metal oxide layer 30, it is distinct from the electrical steel sheet base structure.

Since the island 40 is appropriately discontinuously formed, it may contribute to improving the close contacting property between the metal oxide layer 30 and the steel sheet. Specifically, the density of the islands including the metal oxide under the groove may be 0.25 pieces/$\mu m^2$ or less. In this case, a reference means the density of the islands with respect to a depth area within 5 $\mu m$ below the groove 20 in the cross-section (TD surface) including the steel sheet rolling direction (RD direction) and the thickness direction (ND direction).

The island 40 positioned below the groove 20 may have average sphericity (short axis/long axis) of 0.5 to 0.9. In this case, a reference is the cross-section (TD surface) including the steel sheet rolling direction (RD direction) and the thickness direction (ND direction). The island 40 positioned below a surface in which the groove 20 is not formed is excluded from the calculation of the average particle diameter described above. By controlling the average sphericity of the island 40, it is possible to improve the magnetism and the close contacting property with the insulating coating layer. More specifically, the island 40 positioned below the groove 20 may have average sphericity (short axis/long axis) of 0.6 to 0.8.

After the secondary recrystallization annealing, forming an insulating coating layer on the metal oxide layer may be further included.

A method of forming the insulating coating layer may be used without particular limitation, and for example, the insulating coating layer may be formed by applying an insulating coating solution containing a phosphate. It is preferable to use a coating solution containing colloidal silica and a metal phosphate as the insulating coating solution. In this case, the metal phosphate may be Al phosphate, Mg phosphate, or a combination thereof, and a content of Al, Mg, or a combination may be 15 wt % or more with respect to a weight of the insulating coating solution.

The grain-oriented electrical steel sheet according to the embodiment of the present invention includes the groove 20 positioned on the surface of the electrical steel sheet 10, the metal oxide layer 30 positioned on the groove 20, and the island 40 positioned under the groove.

The island 40 positioned below the groove may have an average sphericity (short axis/long axis) of 0.5 to 0.9. By controlling the average sphericity of the island 40, it is possible to improve the magnetism and the close contacting property with the insulating coating layer. More specifically, the island 40 positioned below the groove 20 may have average sphericity of 0.6 to 0.8. When the average sphericity is less than 0.5, as the close contacting property is deteriorated between the forsterite and the base part, a diameter of the cylinder is found to be 20 mm or more during a close contacting property test due to cracking or bursting of the forsterite after the insulating coating.

The density of the islands 40 under the groove 20 may be 0.25 pieces/$\mu m^2$ or less. In this case, a reference means the density of the islands with respect to a depth area within 5 $\mu m$ below the groove 20 in the cross-section (TD surface) including the steel sheet rolling direction (RD direction) and the thickness direction (ND direction). More specifically, the density of the islands 40 under the groove 20 may be 0.1 pieces/$\mu m^2$ or less.

Hereinafter, the present invention will be described in more detail through examples. However, the examples are only for illustrating the present invention, and the present invention is not limited thereto.

EXAMPLES

A cold-rolled sheet with a thickness of 0.27 mm was prepared. The cold-rolled sheet was irradiated with a 1.0 kW Gaussian mode of continuous wave laser beam at a scanning rate of 10 m/s to form 85° angled grooves with the RD direction. When forming the groove, dry air from which moisture was removed at a pressure of 0.02 kg/$cm^2$ was sprayed on an upper portion thereof at an angle of 70° to the rolling direction. Next, the entire surface of the steel sheet was polished by using a polishing cloth, and the thickness of the oxide layer was adjusted to 5 nm or less as shown in Table 1 below. When the thickness of the oxide layer exceeds 5 nm, the close contacting property is deteriorated. Next, the primary recrystallization annealing was performed, and then the secondary recrystallization was performed after MgO coating to form the insulating coating layer.

The close contacting property was indicated with the minimum diameter in which the insulating coating layer was not peeled and cracked by bending the product sheet to a rod-shaped cylinder having various diameters. The better the close contacting property, the diameter of the rod gradually decreases.

TABLE 1

| Classification | Island's average sphericity | Oxide layer thickness (nm) | Iron loss (W17/50) | Minimum diameter of cylinder (Φ, mm) |
|---|---|---|---|---|
| Example 1 | 0.50 | 2 | 0.80 | 10 |
| Example 2 | 0.53 | 2 | 0.81 | 12 |
| Example 3 | 0.65 | 4 | 0.81 | 12 |
| Example 4 | 0.80 | 3 | 0.82 | 10 |
| Example 5 | 0.90 | 3 | 0.83 | 14 |
| Example 6 | 0.75 | 4 | 0.82 | 12 |
| Example 7 | 0.85 | 5 | 0.81 | 10 |
| Example 8 | 0.71 | 4 | 0.80 | 15 |
| Example 9 | 0.59 | 5 | 0.80 | 15 |
| Example 10 | 0.77 | 2 | 0.80 | 15 |

TABLE 1-continued

| Classification | Island's average sphericity | Oxide layer thickness (nm) | Iron loss (W17/50) | Minimum diameter of cylinder (Φ, mm) |
|---|---|---|---|---|
| Comparative Example 1 | 0.46 | 8 (Oxide layer not removed) | 0.85 | 20 |

As shown in Table 1, it can be confirmed that the examples in which the oxide layer was properly removed after the groove was formed had an excellent close contacting property and excellent iron loss compared to the comparative example.

In addition, in Examples 1 to 10, it was confirmed that when the average sphericity of the islands 40 under the groove was 0.5 to 0.90, respectively, and the density thereof was 0.25 pieces/$\mu m^2$ or less, the iron loss and the close contacting property thereof were excellent.

On the other hand, in the comparative example, it was confirmed that the average sphericity of the islands 40 was less than 0.5, and it was confirmed that a number of islands 40 having a density of the islands 40 exceeding 0.25 pieces/$\mu m^2$ were formed.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

DESCRIPTION OF SYMBOLS

10: grain-oriented electrical steel sheet
20: groove
30: metal oxide layer
40: island

The invention claimed is:

1. A grain-oriented electrical steel sheet, comprising
   a groove positioned on a surface of an electrical steel sheet,
   a metal oxide layer positioned on the groove, and
   metal oxide-based islands that are discontinuously distributed and positioned under the groove and are separated from the metal oxide layer,
   wherein average sphericity of the islands positioned under the groove is 0.5 to 0.9.

2. The grain-oriented electrical steel sheet of claim 1, wherein
   a density of the metal oxide-based islands positioned under the groove is 0.25 pieces/$\mu m^2$.

3. The grain-oriented electrical steel sheet of claim 1, wherein
   2 to 10 grooves are intermittently present with respect to a rolling vertical direction.

4. The grain-oriented electrical steel sheet of claim 1, wherein
   a length direction of the groove and a rolling direction of the steel sheet form an angle of 75 to 88°.

* * * * *